June 30, 1970 J. J. O'TOOLE 3,518,370

MODULATION ERROR CANCELLING APPARATUS

Filed March 30, 1967 2 Sheets-Sheet 1

INVENTOR
John J. O'Toole
BY W. H. Spouagle
ATTORNEY

June 30, 1970 J. J. O'TOOLE 3,518,370

MODULATION ERROR CANCELLING APPARATUS

Filed March 30, 1967 2 Sheets-Sheet 2

INVENTOR
John J. O'Toole

BY W. H. Sponagle
ATTORNEY 3,518,370

MODULATION ERROR CANCELLING APPARATUS

John J. O'Toole, Cherry Hill, N.J., assignor to RCA Corporation, a corporation of Delaware Filed Mar. 30, 1967, Ser. No. 627,012
Int. Cl. H04n 5/40
U.S. Cl. 178—7.1 7 Claims

ABSTRACT OF THE DISCLOSURE

The amplitude, relative to a reference, of the horizontal synchronizing pulses of a composite video signal is detected to form a correcting wave representing any unwanted envelope modulation of the composite video signal and the wave is combined in opposite polarity with the signal to cancel the modulation.

A composite television video signal including synchronizing pulses sometimes is subject inadvertently to extraneous influences which introduce an unwanted low frequency amplitude modulation of the signal envelope. For example, a common extraneous influence is the alternating current power line frequency of a harmonic thereof. A signal so modulated is not suited for modulation of a carrier for transmission.

It, therefore, is an object of this invention to provide apparatus by which to effectively cancel any undesired low frequency modulation of the envelope defined by a composite video signal.

In accordance with an illustrative embodiment of the invention a negative type feedback circuit is provided from a source of a composite video signal including the horizontal synchronizing pulses. Since these synchronizing pulses have a known amplitude relation to a reference amplitude level, any deviation from such relationship is representative of any unwanted amplitude modulation of the signal envelope. Accordingly, the composite video signal is amplitude detected during the horizontal synchronizing intervals, a correcting wave is formed from the detection prdoucts, and the wave is combined with the composite video signal in opposite polarity to effectively cancel the unwanted envelope modulation.

For a more detailed disclosure of the invention reference may be had to the following description which is taken in conjunction with the accompanying drawings, of which:

Figure 1:
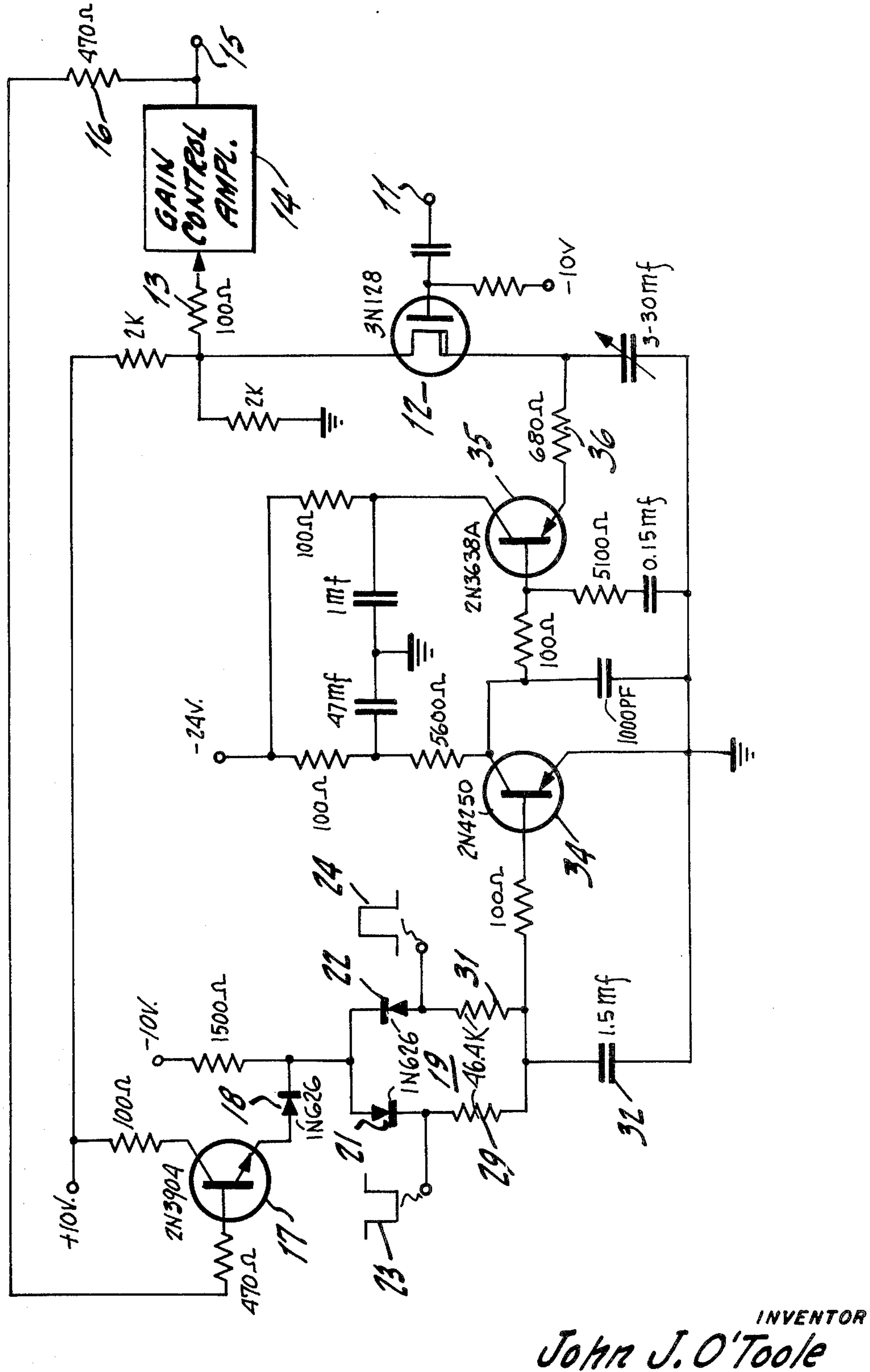
FIG. 1 is a schematic circuit diagram of an illustrative embodiment of the invention.

In FIG. 1, a composite video signal present at the input terminal 11 is impressed upon the gate electrode of an insulated-gate field-effect transistor 12, the drain electrode of which is direct coupled through a resistor 13 to the input of gain control amplifier 14. The output of this amplifier at terminal 15 is coupled to utilization apparatus (not shown) for further processing and/or transmission. The output of the amplifier 14 also is direct coupled through a resistor 16 into a feedback circuit including a detector driver transistor 17. The output from the driver transistor is taken from the emitter electrode thereof, and impressed by means including a diode 18 upon an amplitude detector 19. This detector includes oppositely poled diodes 21 and 22 which are rendered capable of conduction, respectively, by negative-going and positive-going keying pulses 23 and 24. These keying pulses occurr during horizontal synchronizing pulse intervals.

Figures 2, 3, 4:
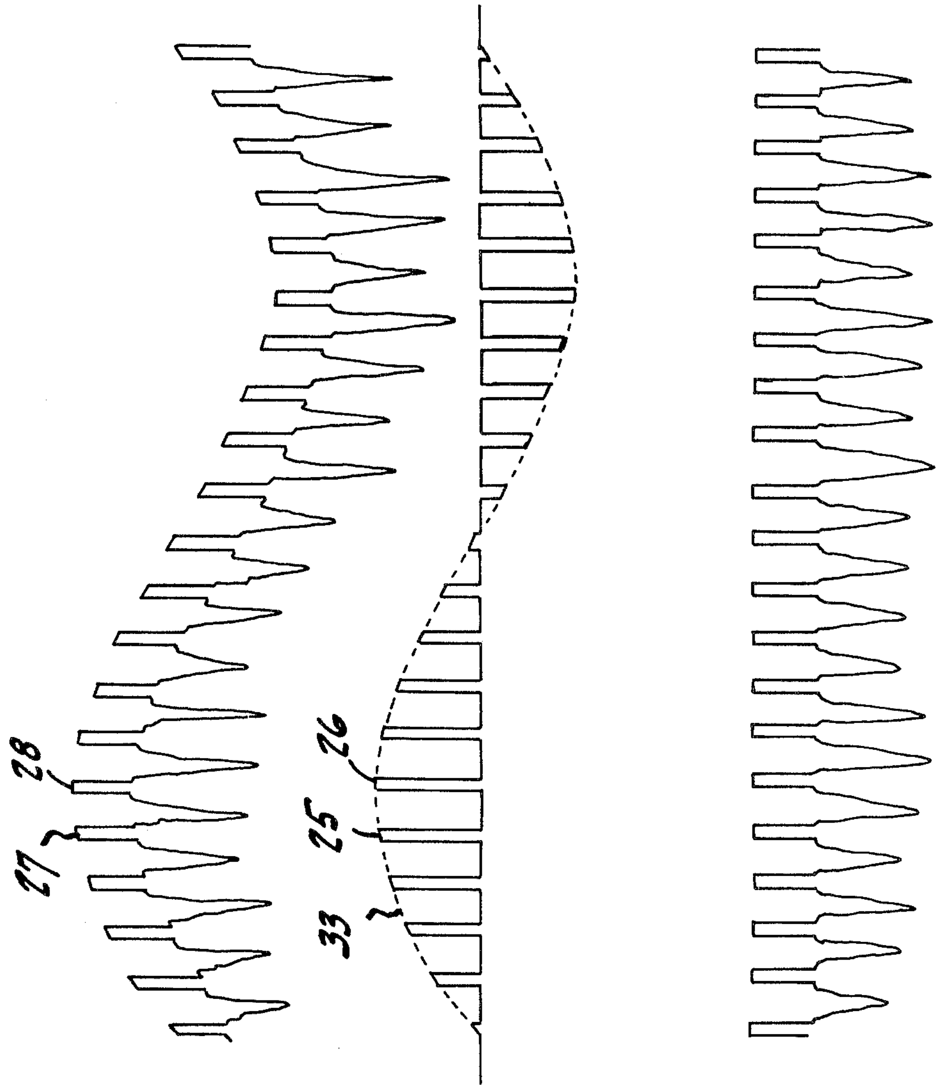
FIG. 2 is a wave form of a representative composite video signal having an undesired low frequency amplitude modulation of its envelope.
FIG. 3 is a wave form illustrating the manner in which a correcting wave is produced.
FIG. 4 is a wave form of a composite video signal from which the envelope modulation indicated in FIG. 1 has been effectively cancelled by means of the invention.

If it is assumed that a composite video signal impressed upon the detector 19 has an undesired amplitude modulation of its envelope such as illustrated in FIG. 2, the detector functions to produce a train of pulses such as the pulses 25 and 26 of FIG. 3 respectively representing the amplitudes relative to a reference level of the horizontal synchronizing pulses 27 and 28 of the composite signal of FIG. 2. This train of pulses is impressed upon a low pass filter comprising resistors 29 and 31 and capacitor 32 which converts the train of pulses into a control wave represented by the curve 33 of FIG. 3. It is seen that the curve 33 which constitutes a correcting wave has an amplitude modulation corresponding to the amplitude modulation of the horizontal synchronizing pulses 27 and 28 of the composite video signal of FIG. 2 relative to a reference level.

The correcting wave of FIG. 3 is impressed upon a polarity reversing transistor 34 of FIG. 1 which functions to suitably amplify the wave 33 and invert its polarity at its collector electrode. The amplified and inverted wave 33 is direct coupled to an emitter follower transistor 35 which produces at its emitter electrode a correcting wave having the same polarity as the wave at the collector electrode of the transistor 34. It is to be noted that this polarity is opposite to the polarity of the unwanted envelope modulation of the video signal impressed upon the gate electrode of the input transistor 12. This inverted polarity correcting wave is injected through a series resistor 36 into the source electrode of the transistor 12. The combination of the video signal at the gate of the transistor 12 and the correcting wave at its source electrode effectively cancels from the composite video wave at the drain electrode any undesired modulation of the envelope of the composite video signal. As a result, the output signal from the transistor 12 and the amplifier 14 will have the general configuration of the composite video signal wave of FIG. 4.

It will be recognized that, as in all negative feedback systems used for effecting some correction of a signal, the wave forms of FIGS. 2, 3 and 4 are somewhat ideal and grossly exaggerated for purposes of illustrating the operation of the apparatus embodying the invention. For any correcting system of this general character, the correction can be effected only in response to a detected error. Consequently there necessarily is some residual error in the final signal. Nevertheless the apparatus embodying the present invention functions satisfactorily to produce a composite video signal in which low frequency modulation of its envelope is held to a practical minimum.

In general, the degree of envelope modulation cancellation is dependent primarily upon the gain achieved in the stage including the transistor 34 which, as explained, determines the amplitude of the correcting wave applied to the source electrode of the transistor 12. The circuit of FIG. 1 has been successfully employed in a particular apparatus to effect envelope modulation rejection ratios of 26 to 30 db by using only the single negative gain amplifier stage including the transistor 34. In cases where even greater rejection ratios are desired, the amplifier may include one or more additional stages without departing from the present invention.

It also is to be noted that apparatus embodying this invention will provide satisfactory performance by means of a conventional bi-polar transistor as the input transistor 12. Somewhat superior results can be achieved by the use of the illustrated and described insulated-gate field-effect transistor 12 as the video signal input stage. The principal reasons for the improved performance of the system when such a transistor is used include: (1) the capacity of such a device for handling a large dynamic range of input signal without distortion, (2) its excellent differential phase and gain performance in the presence of a relatively large undesired amplitude modulation of the composite video signal, and (3) the fact that it has a uniform, relatively high input impedance in the presence of relatively large amplitude input signals.

What is claimed:

1. Modulation error cancelling apparatus for removing low frequency amplitude modulation of a video signal envelope, comprising:

a source of a composite video signal including horizontal synchronizing pulses, the envelope of a train of said pulses having an undesired amplitude modulation;

detecting means responsive to said video signal during a sample period for deriving therefrom a correcting wave continuously corresponding to said amplitude modulation and;

combining means including an adder stage for combining said correcting wave with said composite video signal in opposite polarity for cancelling said undesired amplitude modulation.

2. Modulation error cancelling apparatus as defined in claim 1, wherein:

said detecting means is direct coupled to said video signal source and includes a sampler responsive only to said horizontal synchronizing pulse amplitudes relative to a reference potential.

3. Modulation error cancelling apparatus as defined in claim 2, wherein:

said sampler comprises two oppositely poled unidirectionally conducting devices; and means for rendering said devices capable of conduction only during the occurrence of said horizontal synchronizing pulses to produce a train of error pulses having amplitudes and polarities relative to said reference potential corresponding to the amplitudes and polarities of said synchronizing pulses relative to said reference potential.

4. Modulation error cancelling apparatus as defined in claim 3, wherein:

said detecting means includes a low pass filter coupled to said sampler to convert said train of error pulses into a continuous wave corresponding to said undesired amplitude modulation of said video signal envelope.

5. Modulation error cancelling apparatus as defined in claim 4, wherein:

said combining means includes an amplifying and polarity reversing stage having an input coupled to said low pass filter to receive said continuous wave and an output at which to develop said correcting wave.

6. Modulation error cancelling apparatus as defined in claim 5, wherein:

said combining means includes an adder stage having a first input coupled to said source of a composite video signal, a second input coupled to the output of said amplifying and polarity reversing stage and an output at which to develop a corrected composite video signal.

7. Modulation error cancelling apparatus as defined in claim 6, wherein:

said adder stage comprises an insulated-gate field-effect transistor having a gate electrode constituting said first input, a source electrode constituting said second input and a drain electrode constituting said output.

References Cited

UNITED STATES PATENTS

| | | | |
|---|---|---|---|
| 2,785,222 | 3/1957 | White. | |
| 2,896,078 | 7/1959 | Moore | 178—5.4 XR |
| 2,908,753 | 10/1959 | Ernyel et al. | |
| 3,377,430 | 4/1968 | Frank. | |

ROBERT L. GRIFFIN, Primary Examiner

R. MURRAY, Assistant Examiner